United States Patent
Mittelstadt

(10) Patent No.: US 11,271,383 B2
(45) Date of Patent: Mar. 8, 2022

(54) AUTO WIRE-SIZE DETECTION IN BRANCH CIRCUIT BREAKERS

(71) Applicant: Schneider Electric USA, Inc., Andover, MA (US)

(72) Inventor: Chad R. Mittelstadt, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 252 days.

(21) Appl. No.: 16/716,877

(22) Filed: Dec. 17, 2019

(65) Prior Publication Data

US 2021/0184450 A1 Jun. 17, 2021

(51) Int. Cl.
| | |
|---|---|
| *H01H 7/00* | (2006.01) |
| *H02H 9/02* | (2006.01) |
| *H02H 3/08* | (2006.01) |
| *H02H 3/10* | (2006.01) |
| *H02H 3/00* | (2006.01) |
| *H02H 1/00* | (2006.01) |
| *H02H 3/093* | (2006.01) |

(52) U.S. Cl.
CPC .......... *H02H 3/006* (2013.01); *H02H 1/0007* (2013.01); *H02H 3/093* (2013.01); *H01H 7/00* (2013.01); *H02H 3/08* (2013.01); *H02H 3/105* (2013.01); *H02H 9/02* (2013.01)

(58) Field of Classification Search
CPC ............ H02H 3/08; H02H 3/105; H02H 9/02; H01H 7/00
USPC ................................................ 361/93.1, 102
See application file for complete search history.

(56) References Cited

U.S. PATENT DOCUMENTS

| | | | | |
|---|---|---|---|---|
| 5,877,691 | A * | 3/1999 | Suptitz | H01H 71/0228 340/638 |
| 10,072,997 | B2 * | 9/2018 | Bubar | H01H 3/0226 |
| 10,151,798 | B2 * | 12/2018 | Ricciuti | G01R 31/3274 |
| 10,176,940 | B2 | 1/2019 | Pignier et al. | |
| 2007/0053127 | A1 * | 3/2007 | Dobbs | H01H 71/125 361/93.1 |
| 2008/0012670 | A1 * | 1/2008 | Davison | H01H 71/74 335/172 |
| 2008/0079437 | A1 * | 4/2008 | Robarge | G01R 15/146 324/522 |
| 2015/0070026 | A1 * | 3/2015 | Vincent | H02H 3/10 324/522 |

(Continued)

*Primary Examiner* — Gary A Nash
(74) *Attorney, Agent, or Firm* — Locke Lord LLP

(57) ABSTRACT

A field programmable circuit breaker receives a measurement of a displacement of a terminal spring element, from a detector associated with the terminal spring element, when a field wire is inserted into the terminal spring element. The terminal spring element provides a wire clamp force in a terminal configured to receive the inserted field wire. A trip current value is determined based on the wire size and a time interval is measured during which the current in the field wire is continuously greater than the trip current value. A trip curve is accessed corresponding to the trip current value to determine whether the measured time interval exceeds a maximum interval indicated by the trip curve. A tripping signal provided to a current monitoring unit interrupts the current when the measured interval exceeds the maximum interval for the measured current to be continuously greater than the trip current value.

20 Claims, 12 Drawing Sheets

(56) References Cited

U.S. PATENT DOCUMENTS

2017/0053759 A1\* 2/2017 Borgwardt ............. G01R 31/72
2018/0062380 A1\* 3/2018 Sorin ................... H02H 1/0007

\* cited by examiner

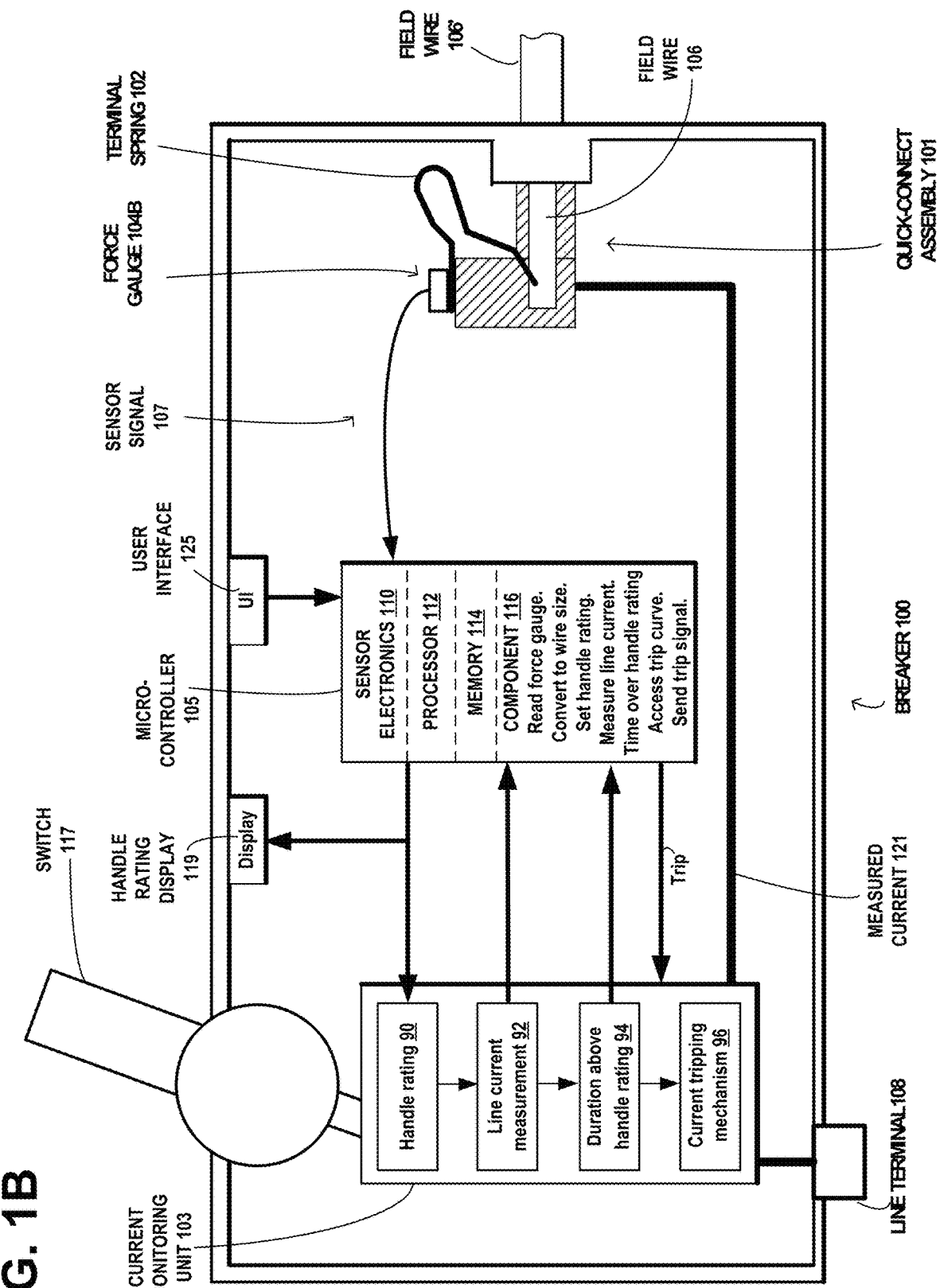

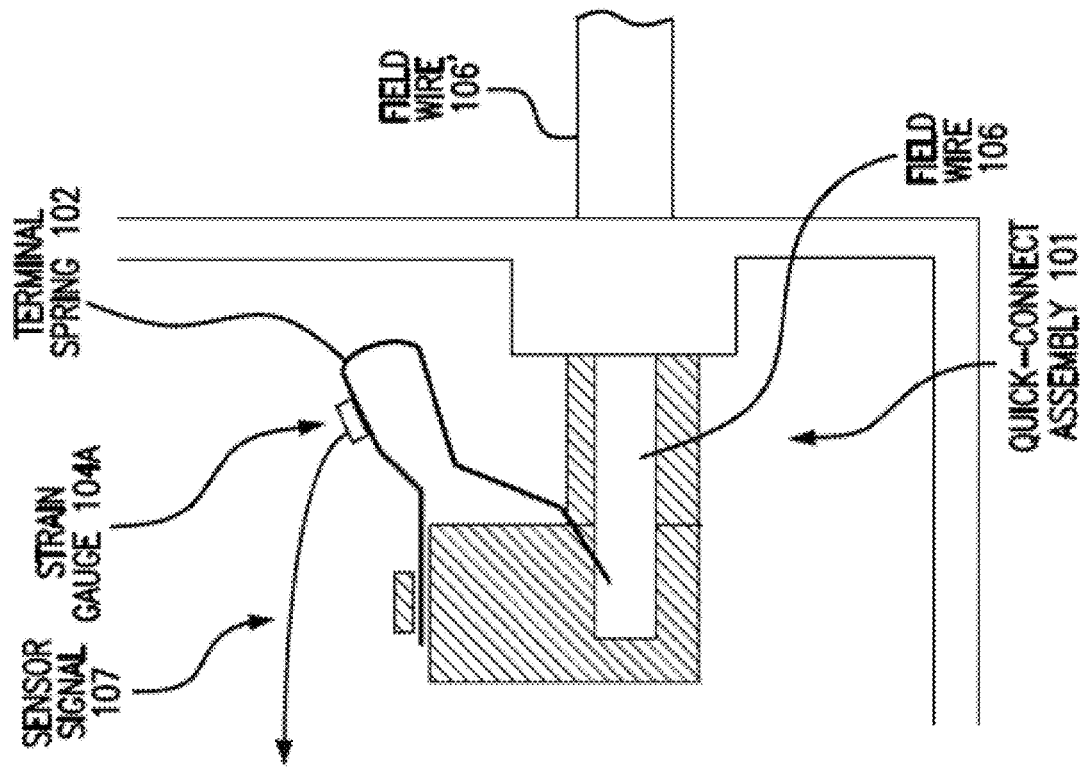
FIG. 2A
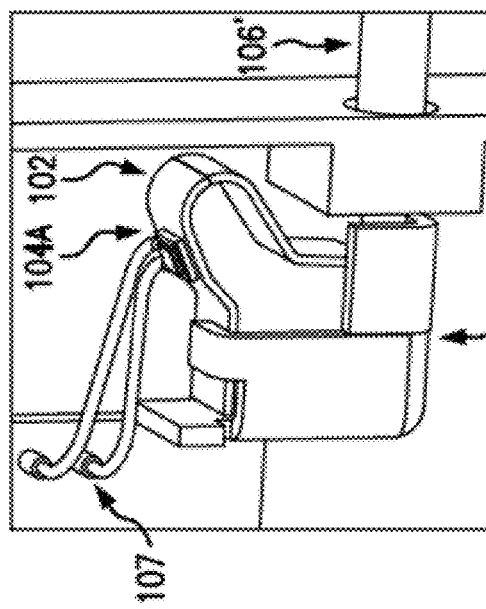
FIG. 2A'
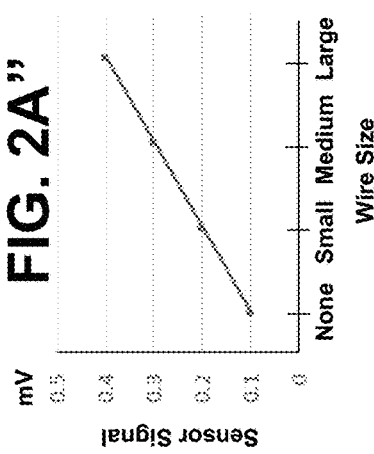
FIG. 2A"

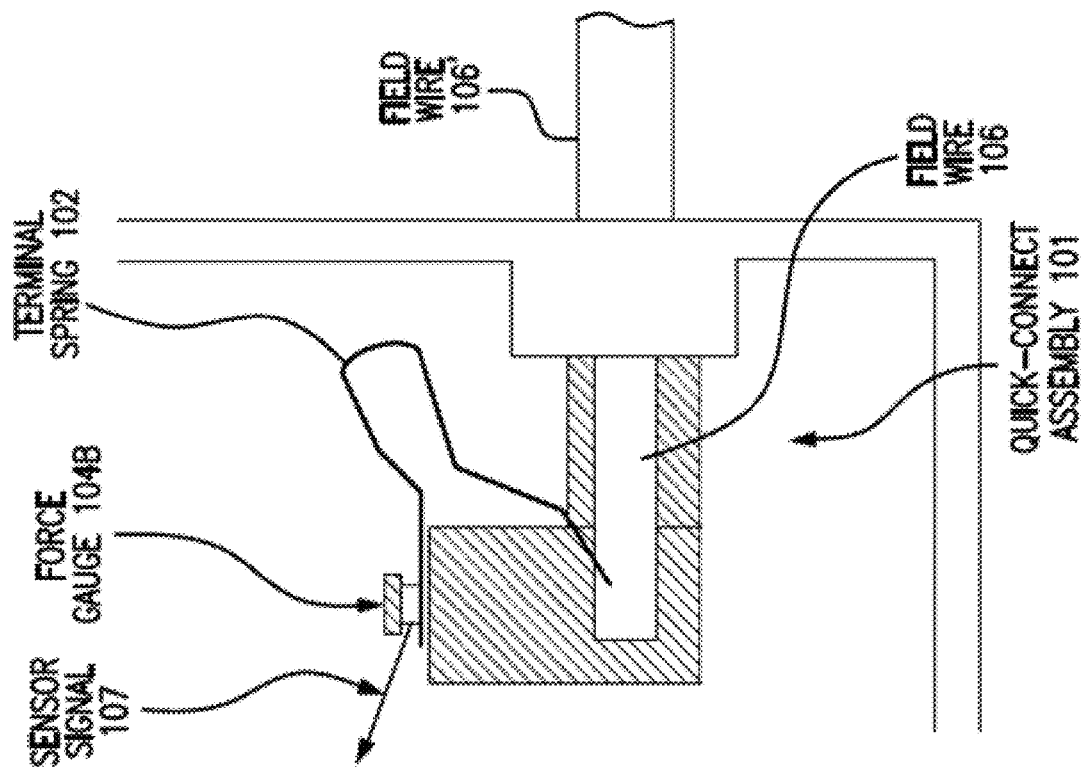
FIG. 2B
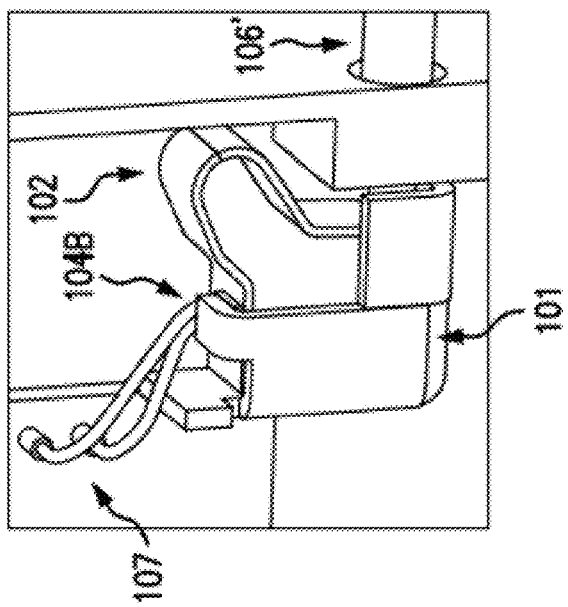
FIG. 2B'
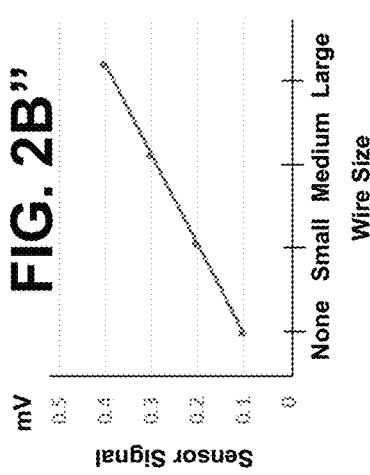
FIG. 2B"

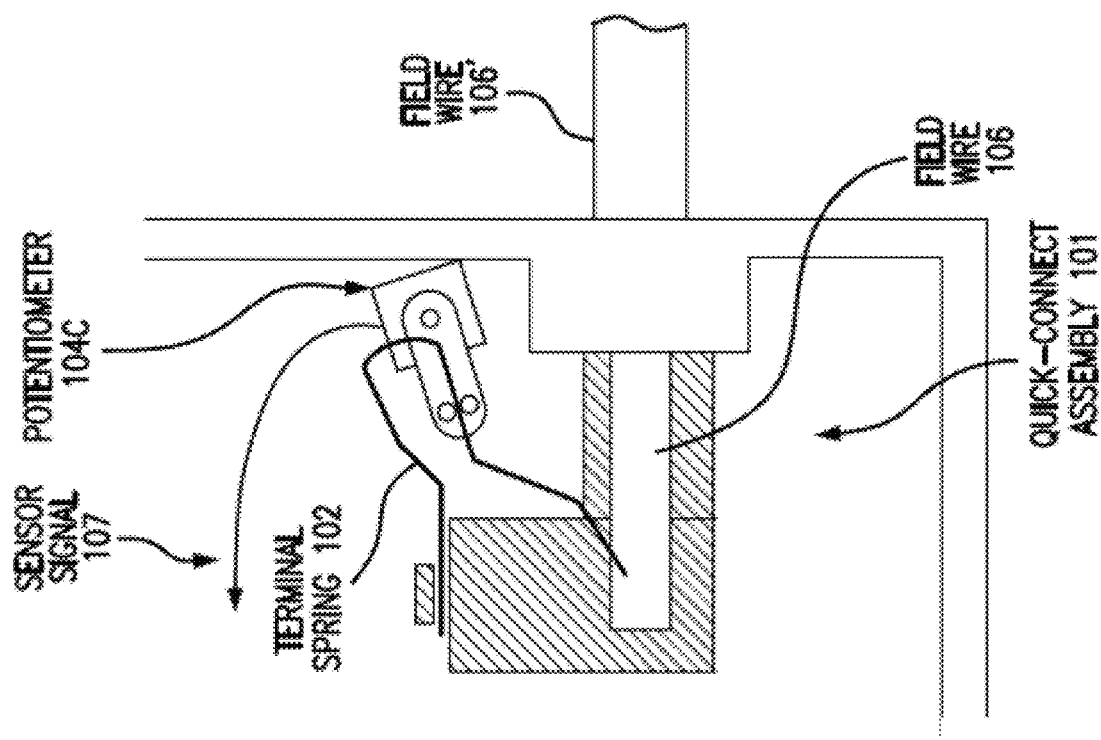
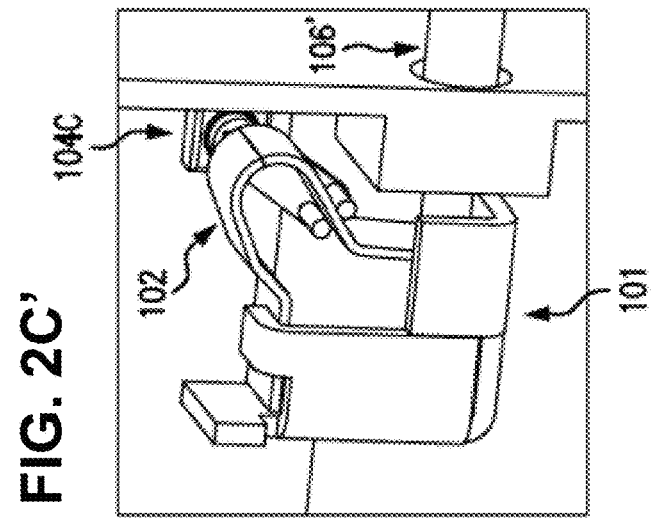
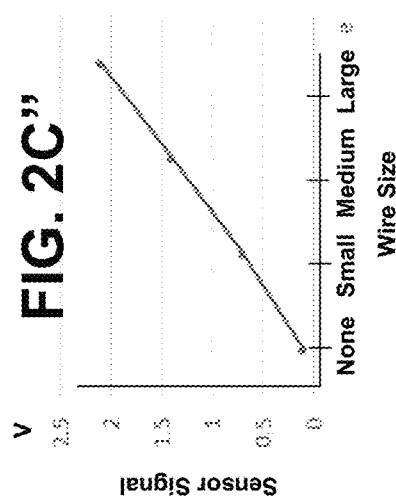
FIG. 2C
FIG. 2C'
FIG. 2C"

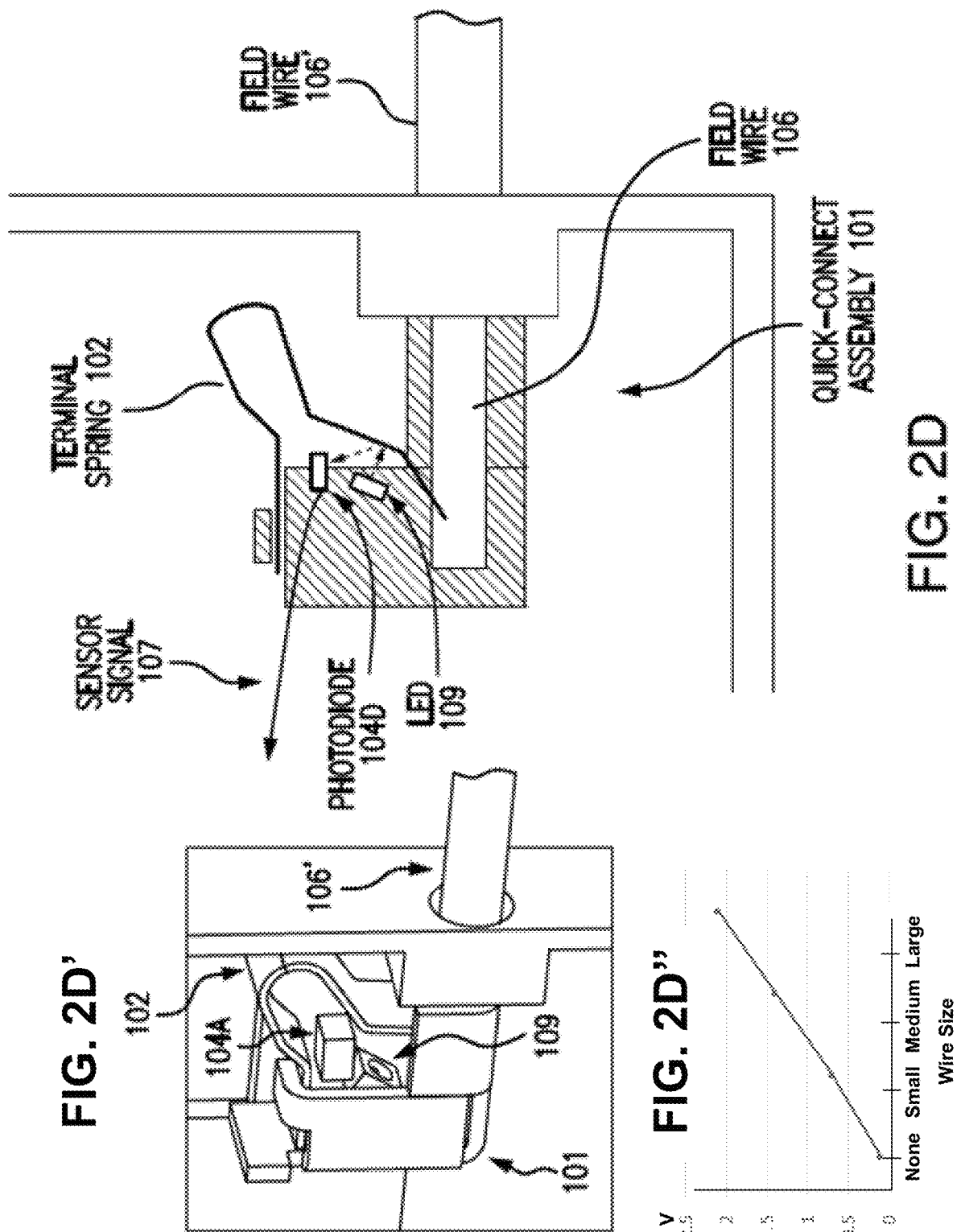
FIG. 2D
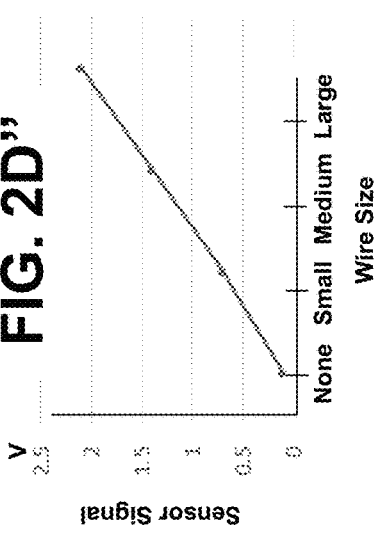

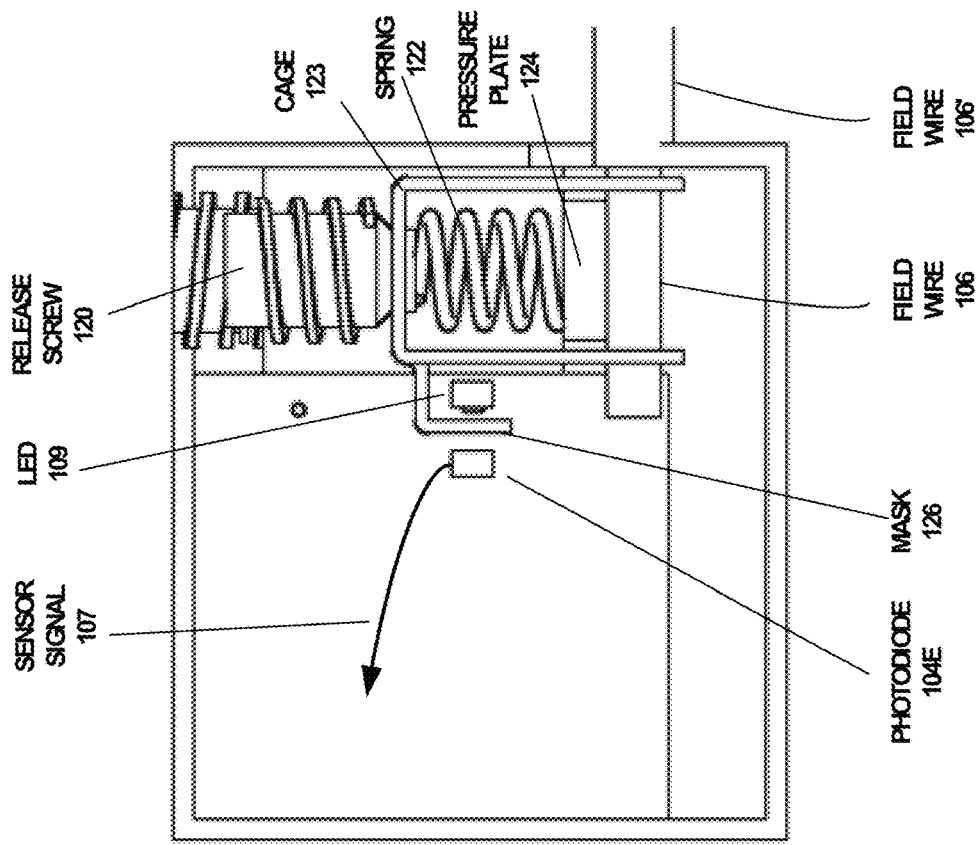
FIG. 2E
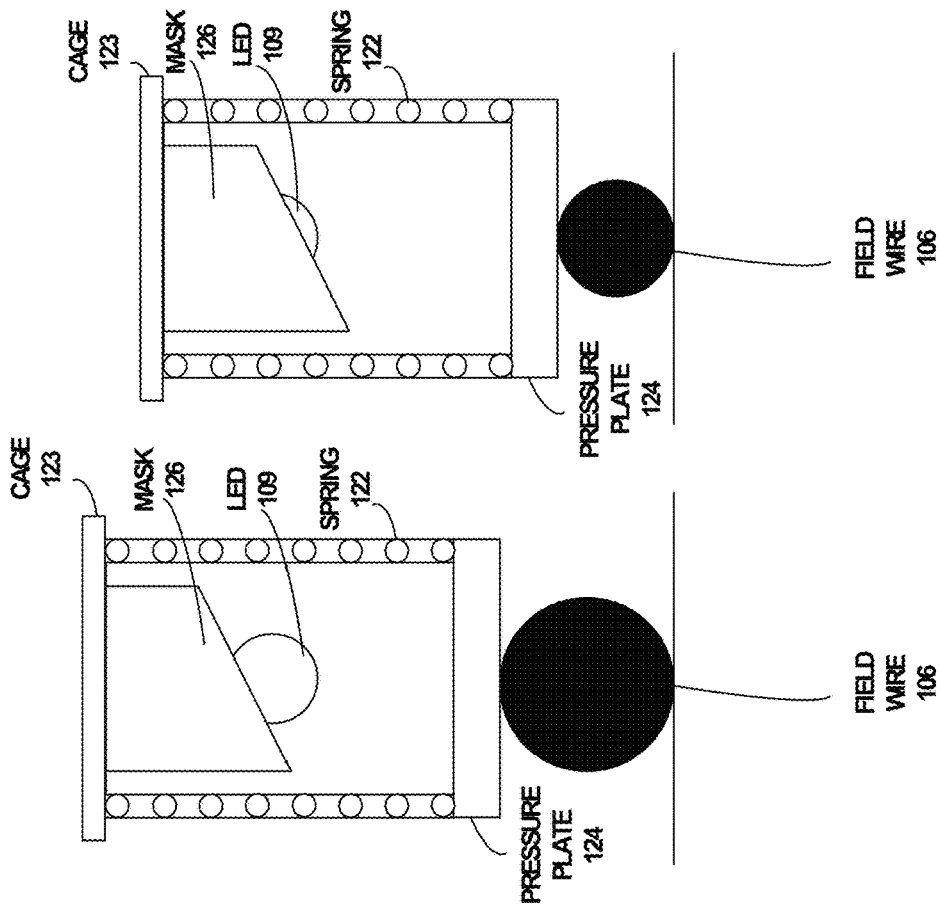
FIG. 2E'
FIG. 2E''

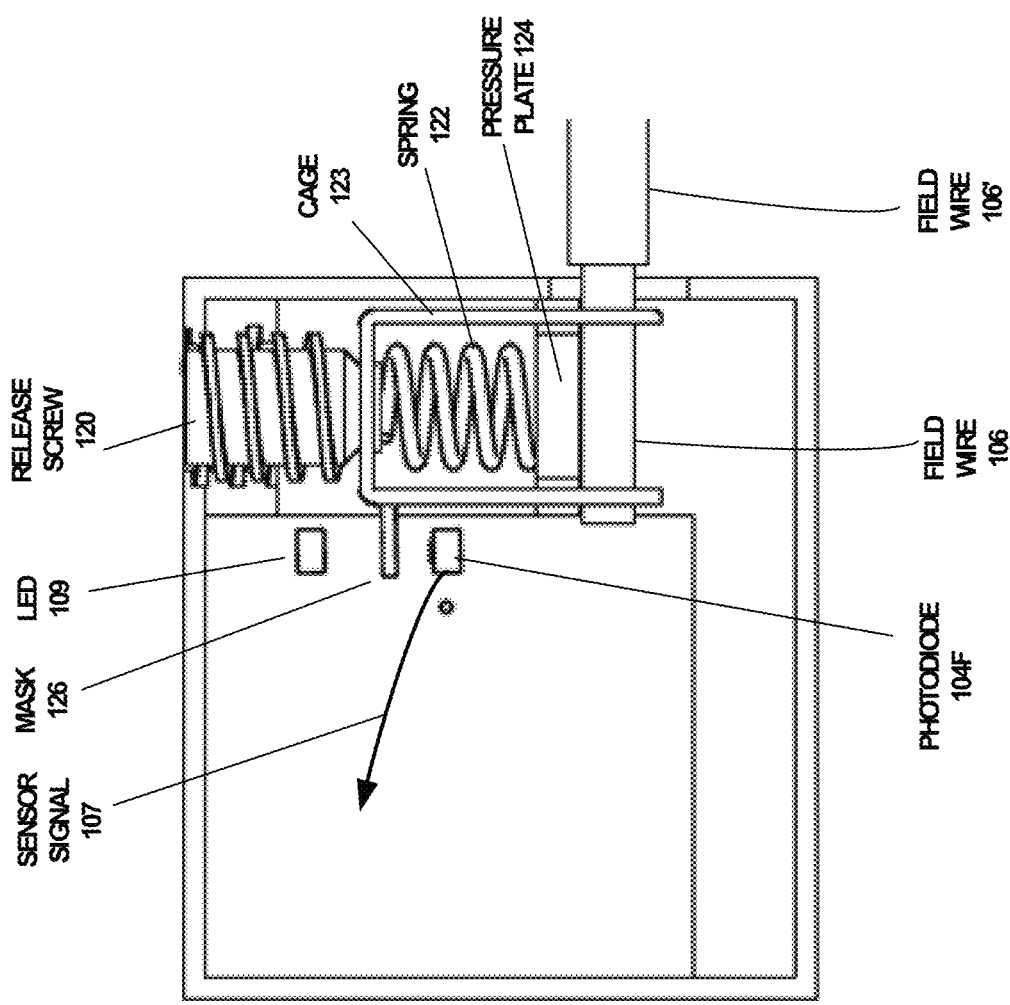

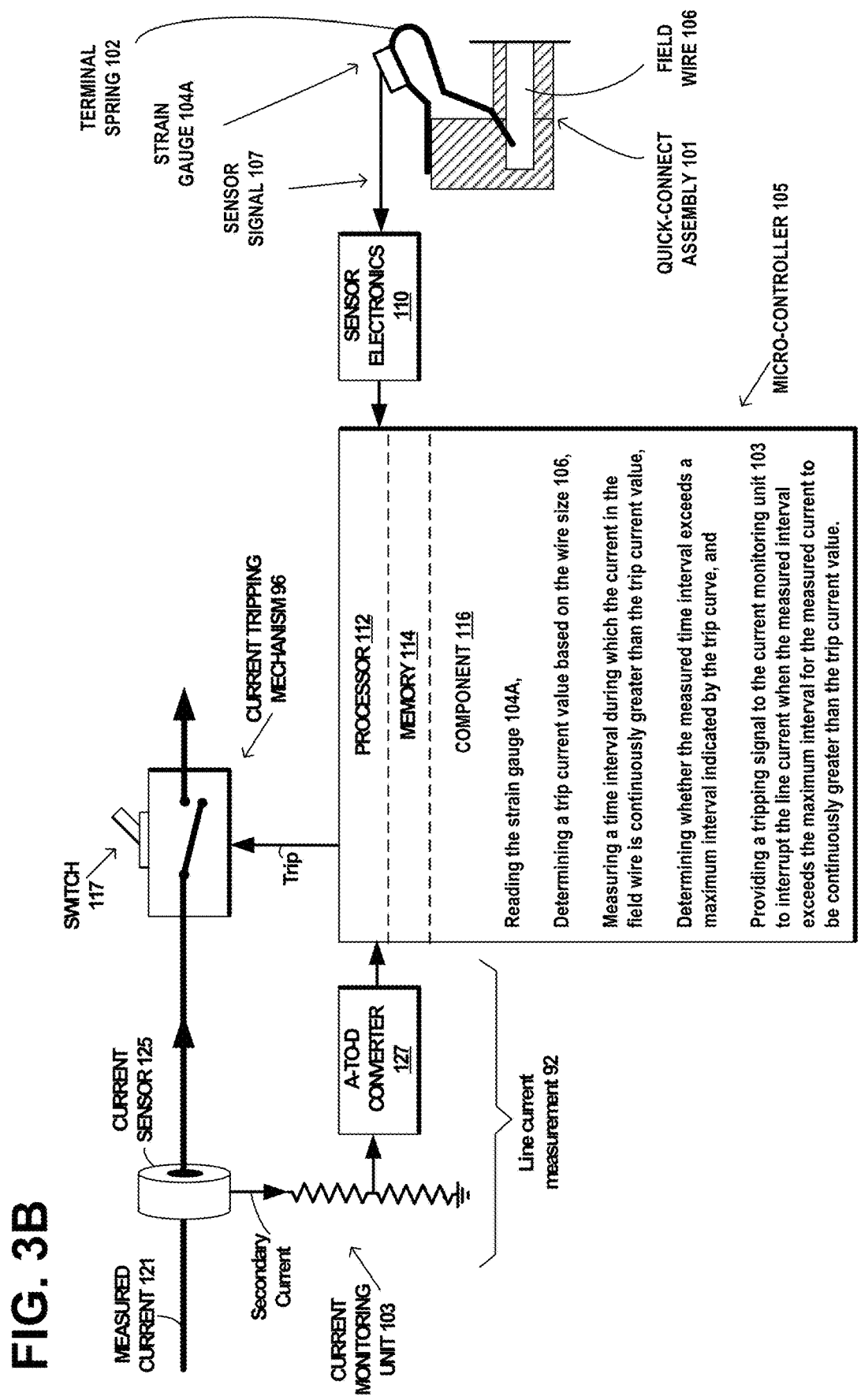

AUTO WIRE-SIZE DETECTION IN BRANCH CIRCUIT BREAKERS

TECHNICAL FIELD

The present disclosure relates to field programmable circuit breakers, and more particularly, to providing a field programmable circuit breaker that enables an installer to conveniently choose a safe current rating of the circuit breaker at the time of installation, based on the breaker detecting the size of wire the installer is connecting to the breaker.

BACKGROUND

The National Electrical Code (NEC) standard specifies safe installation practices for electrical wiring and equipment in the United States. When a circuit breaker is installed, the NEC requires that it must have a limited current rating so to that it will protect both the equipment in the circuit and the electrical wiring. The NEC places limits on circuit breaker current rating, according to the conductor size being used. By limiting how small a conductor may be that is connected to a circuit breaker of a specific size, the NEC provides a degree of protection against wire overheating that could lead to insulation failure and electrical faults.

What is needed is a field programmable circuit breaker that enables an installer to conveniently choose a safe current rating of the circuit breaker at the time of installation, based on the breaker detecting the size of the wire the installer is connecting to the breaker.

SUMMARY

In accordance with one embodiment described herein, a field programmable circuit breaker receives a measurement of a displacement of a terminal spring element, from a detector associated with the terminal spring element, when a field wire is inserted into the terminal spring element. The terminal spring element provides a wire clamp force in a terminal configured to receive the inserted field wire. A trip current value is determined based on the wire size and a time interval is measured during which the current in the field wire is continuously greater than the trip current value. A trip curve is accessed corresponding to the trip current value to determine whether the measured time interval exceeds a maximum interval indicated by the trip curve. A tripping signal provided to a current monitoring unit interrupts the current when the measured interval exceeds the maximum interval for the measured current to be continuously greater than the trip current value.

In accordance with an embodiment described herein, the detector may be a strain gauge mounted on the terminal spring element, configured to measure displacement of the terminal spring element when the field wire is inserted into the terminal spring element.

In accordance with an embodiment described herein, the detector may be is a force gauge mounted on the terminal spring element, configured to measure displacement of the terminal spring element when the field wire is inserted into the terminal spring element.

In accordance with an embodiment described herein, the detector may be a rotary potentiometer in mechanical contact with the terminal spring element, configured to measure displacement of the terminal spring element when the field wire is inserted into the terminal spring element.

In accordance with an embodiment described herein, the detector may be a photodiode positioned to receive light reflected from a surface of the terminal spring element, configured to measure displacement of the terminal spring element when the field wire is inserted into the terminal spring element.

In accordance with another embodiment described herein, a field programmable circuit breaker receives a measurement of a displacement of a wire clamp, from a detector associated with the wire clamp, when a field wire is inserted into the wire clamp. A trip current value is determined based on the wire size and a time interval is measured during which the current in the field wire is continuously greater than the trip current value. A trip curve is accessed corresponding to the trip current value to determine whether the measured time interval exceeds a maximum interval indicated by the trip curve. A tripping signal provided to a current monitoring unit interrupts the current when the measured interval exceeds the maximum interval for the measured current to be continuously greater than the trip current value.

The resulting method, apparatus, system, and computer program product provides a field programmable circuit breaker that enables an installer to conveniently choose a safe current rating of the circuit breaker at the time of installation, based on the breaker detecting the size of wire the installer is connecting to the breaker.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 1B illustrates an example functional block diagram of a field programmable circuit breaker that adjusts a safe current rating, based on a force gauge or load cell detecting the size of wire being connected to the breaker, according to an embodiment of the disclosure.

FIGS. 2A, 2A', and 2A" illustrate a more detailed view of the strain gauge of FIG. 1A detecting the size of wire being connected to the breaker, according to an embodiment of the disclosure.

FIGS. 2B, 2B', and 2B" illustrate a more detailed view of the force gauge of FIG. 1B detecting the size of wire being connected to the breaker, according to an embodiment of the disclosure.

FIGS. 2C, 2C', and 2C" illustrate a detailed view of a potentiometer gauge detecting the size of wire being connected to the breaker, according to an embodiment of the disclosure.

FIGS. 2D, 2D', and 2D" illustrate a detailed view of a photodiode gauge detecting the size of wire being connected to the breaker, according to an embodiment of the disclosure.

FIGS. 2E, 2E', and 2E" illustrate a detailed view of a photodiode gauge detecting the size of wire being connected to the breaker, based on a first example embodiment of a wire clamp in a terminal configured to receive a field wire inserted into the wire clamp, according to an embodiment of the disclosure.

FIG. 3B illustrates a circuit and functional block diagram of an example current monitoring unit, according to an embodiment of the disclosure.

Identical reference numerals have been used, where possible, to designate identical elements that are common to the figures. However, elements disclosed in one embodiment may be beneficially utilized on other embodiments without specific recitation.

DETAILED DESCRIPTION

Figure 1A:
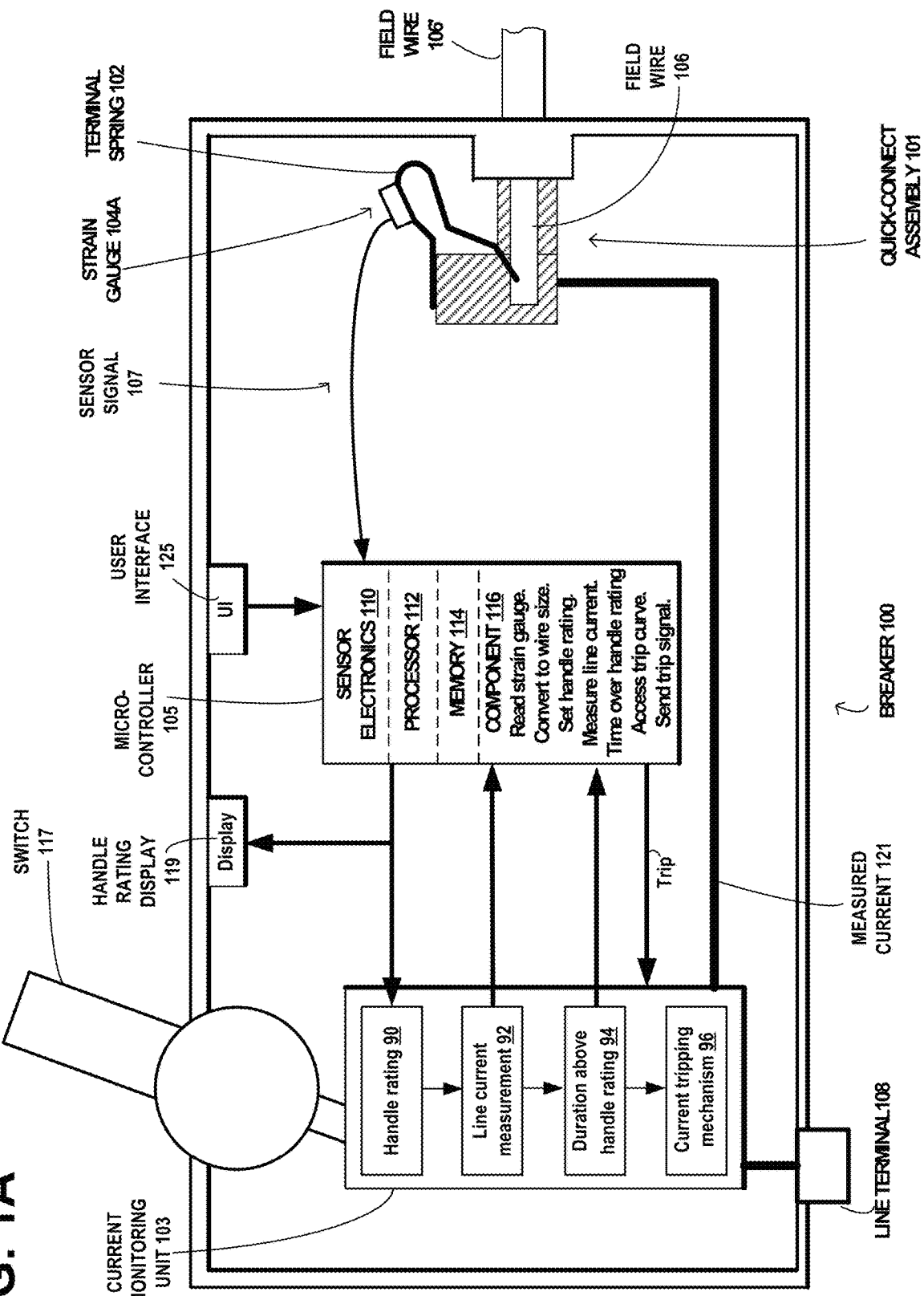
FIG. 1A illustrates an example functional block diagram of a field programmable circuit breaker that adjusts a safe current rating, based on a strain gauge detecting the size of wire being connected to the breaker, according to an embodiment of the disclosure.

FIG. 1A illustrates an example functional block diagram of a field programmable circuit breaker 100 that adjusts a safe current rating, based on a strain gauge 104A detecting the size of a field wire 106 being inserted into a terminal 101 of the breaker 100, according to an embodiment of the disclosure. The field programmable circuit breaker 100 may be a miniature circuit breaker that is typically plugged into an electrical panel of a building under construction. The breaker 100 provides a means to control and protect the electrical panel, the branch circuit wiring 106 connected to the breaker, and the electrical devices connected in the branch circuit, protecting them from excessive, damaging currents.

The example terminal 101 shown in FIG. 1A is a quick-connect assembly 101 that includes a terminal spring 102 that flexibly engages the field wire 106 as it is inserted into the quick-connect assembly. The field wire 106 has an outside insulating coating 106' encasing the electrically conductive wire 106. The terminal spring 102 of the quick-connect assembly 101 is electrically conductive and its free end applies a wire clamp force on the wire 106, which serves to electrically connect the conductive wire 106 to a current monitoring unit 103 of the circuit breaker 100 for the conduction of a measured current 121.

FIGS. 2A, 2A', and 2A'' illustrate a more detailed view of the terminal spring 102 of FIG. 1A, with one end rigidly mounted to the quick-connect assembly and the other, free end flexibly engaging the wire 106 as it is inserted into the quick-connect assembly. The strain gauge 104A measures the displacement or flexing of the terminal spring 102, which is approximately proportional to the displacement of the free end of the spring as the wire 106 is inserted beneath the end of the spring. The strain gauge 104A has electrical resistance that varies with the tension or compression of the terminal spring 102 as the inserted wire 106 applies force on the free end of the spring. The strain gauge 104A converts the tension or compression into a change in electrical resistance, which can then be measured as a sensor signal 107 by the sensor electronics 110. The tension or compression of the terminal spring 102 as the inserted wire 106 applies force on the free end of the spring, is directly related to the diameter of the wire 106. FIG. 2A'' shows a graph of the sensor signal 107 in mV units output from the strain gauge 104A as a function of the size of the field wire 106.

A micro-controller 105 in the field programmable circuit breaker 100, includes the sensor electronics 110, at least one processor 112, at least one memory 114, and a component 116. The example component 116 includes logic blocks that may be implemented by computer program instructions stored in the memory 114 and executed by the processor 112 in the micro-controller 105. Alternately, the logic blocks may also be implemented by computer hardware logic in the micro-controller 105, which can carry out the functions specified by the logic blocks.

In the embodiment shown in FIG. 1A, the component 116 may include logic blocks for the functions of: Read strain gauge; Convert to wire size; Set handle rating; Measure line current; Determine time over handle rating; Access trip curve; and Send trip signal. The trip current value may be determined based on the wire size from a standard relationship of trip current values to wire sizes, such as provided by the National Electrical Code (NEC) standard.

The current monitoring unit 103 includes the main breaker switch 117 and its handle, the register for handle rating 90, the line current measurement unit 92, the register for the duration above the handle rating 94, and the current tripping mechanism 96. The main breaker switch 117 is part of the current tripping mechanism 96. The value of the trip current determined by the micro-controller 105 is set in the register for handle rating 90.

Figure 3A:
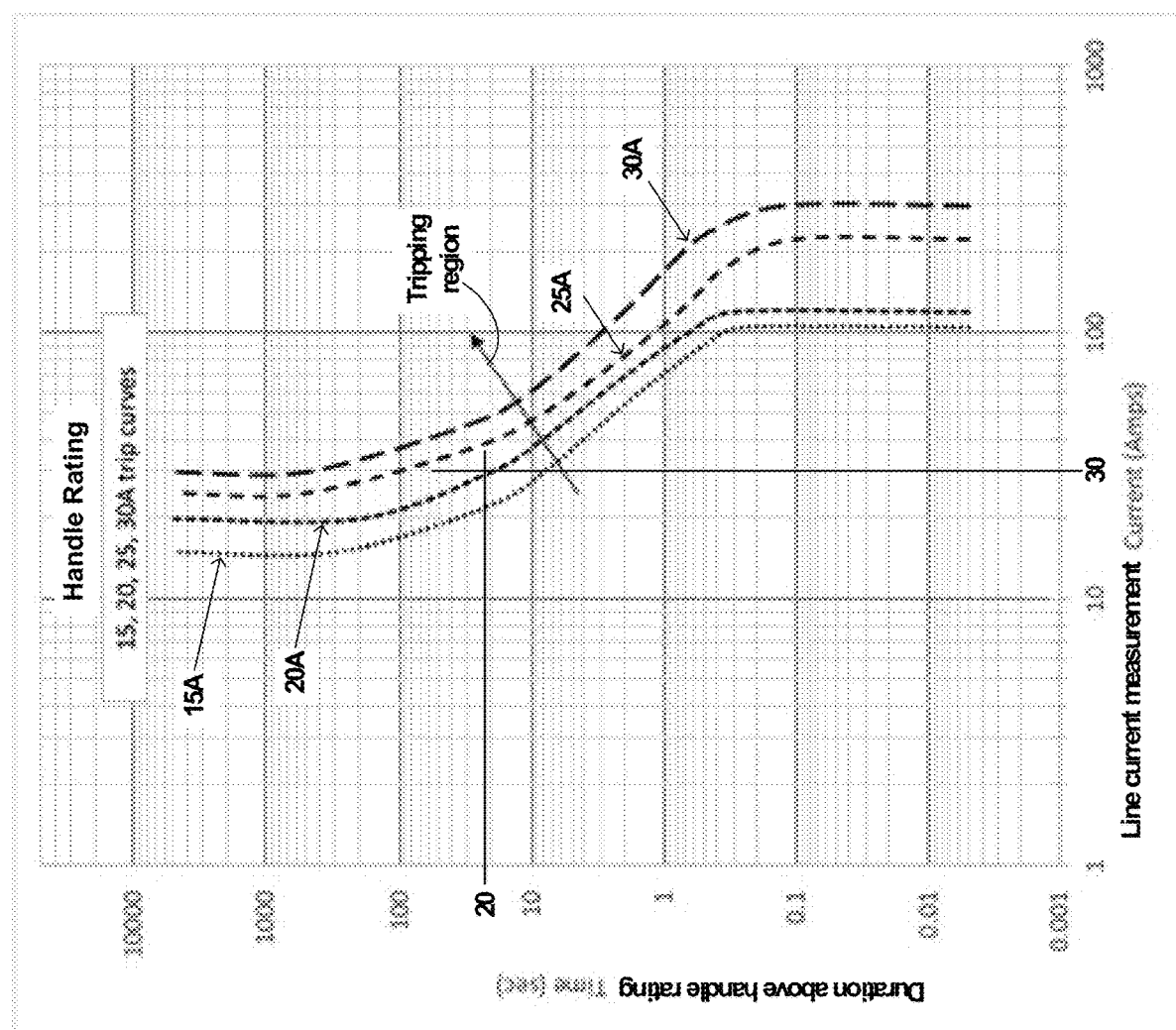
FIG. 3A illustrates an example set of trip curves, each trip curve for a different respective trip current value, each trip curve illustrating a duration of a time interval as a function of a measured line current, the duration of the time interval being for a condition that the line current is continuously greater than the trip current value.

FIG. 3A illustrates an example set of trip curves, each trip curve 15A, 20A, 25A, ans 30A for a different respective trip current value. Each trip curve illustrates a duration of a time interval as a function of a measured line current, the duration of the time interval being for a condition that the line current is continuously greater than the trip current value.

A circuit breaker with a 20 Ampere handle rating will never trip at a line current of 20 Amperes, instead it can run forever at its handle rating. The lines on the trip curves merely show the beginning of the trip band or tripping region to the right and/or above each respective trip curve in FIG. 3A.

For example, a digital circuit breaker with a 20 Ampere handle rating will have a current detector, for example a current transformer, and a timer. When the measured current increases to more than 20 Amps (the value in the handle rating register 90), then the timer starts. On the 20 A trip curve in FIG. 3A, the x-axis is the present measured current. For example, at a measured current of 30 Amps on the x-axis, the y-axis on the 20 A trip curve corresponds to a 20 second delay before tripping. If the measured current continues at the 30 Amp level for more than 20 seconds, then the micro-controller 105 outputs a trip signal to the main switch 117 to interrupt the current.

FIG. 3B illustrates a circuit and functional block diagram of an example current monitoring unit 103 and its relationship to the micro-controller 105 and the strain gauge 104A. The measured current 121 is measured by the current transformer sensor 125 and flows through the breaker switch 117 to the line terminal 108 in FIG. 1A. In the line current measurement unit 92, the secondary current from the current transformer sensor 125 flows through a voltage divider that applies a voltage approximately proportional to the measured current 121, to the analog-to-digital converter 127.

The digital value output by the analog-to-digital converter 127 is applied to one terminal of the processor 112, the other terminal of which receives a digital representation of the sensor signal 107. In summary, the component 116 of the micro-controller 105 may include logic blocks at least for the functions of:

Reading the strain gauge 104A,
Determining a trip current value based on the wire size 106,
Measuring a time interval during which the current in the field wire is continuously greater than the trip current value,
Accessing trip curve (FIG. 3A) corresponding to the trip current value,
Determining whether the measured time interval exceeds a maximum interval indicated by the trip curve, and
Providing a tripping signal to a current monitoring unit 103 to interrupt the line current when the measured interval exceeds the maximum interval for the measured current to be continuously greater than the trip current value.

The field programmable circuit breaker 100, may include a rating display 119 located where the installer of the breaker may view the display. The value displayed in the display 119 may be the handle rating value or the trip current value. Initially, the handle rating value is set equal to the trip current value. The field programmable circuit breaker 100, may include a user interface 125, such as a button, dial, or touch screen, configured to provide the installer with a control input to reduce the handle rating value to be less than the trip current value. This is useful when there may be electrical devices connected to the branch circuit that may be rated for less current than the trip current value.

FIG. 1B illustrates an example functional block diagram of the field programmable circuit breaker 100 that adjusts a safe current rating, based on a load cell or force gauge 104B detecting the size of the 106 wire being connected to the breaker 100, according to an embodiment of the disclosure.

FIGS. 2B, 2B', and 2B" illustrate a more detailed view of the terminal spring 102 of FIG. 1B, with one end rigidly mounted to the quick-connect assembly and the other, free end flexibly engaging the wire 106 as it is inserted into the quick-connect assembly. The load cell or force gauge 104B measures the displacement or flexing of the terminal spring 102, which is approximately proportional to the displacement of the free end of the spring as the wire 106 is inserted beneath the end of the spring. The force gauge 104B is sandwiched between the terminal spring 102 and the rigid structure of the quick-connect assembly 101 so that the force gauge 104B is compressed when the terminal spring 102 is flexed in response to the insertion of the wire 106. Force gauges typically work by deforming either a digital load cell or a strain gauge in the digital load cell. The force imposed is converted into an electrical signal that varies with the tension or compression of the terminal spring 102 as the inserted wire 106 applies force on the free end of the spring. The force gauge 104B converts the tension or compression into a change in the electrical signal, which can then be measured as a sensor signal 107 by the sensor electronics 110. The tension or compression of the terminal spring 102 as the inserted wire 106 applies force on the free end of the spring, which is directly related to the diameter of the wire 106, as previously described. FIG. 2B" shows a graph of the sensor signal 107 in mV units output from the load cell or force gauge 104B as a function of the size of the field wire 106.

FIGS. 2C, 2C', and 2C" illustrate a detailed view of a potentiometer gauge 104C detecting the size of the wire 106 being connected to the breaker, according to an embodiment of the disclosure. The terminal spring 102 has one end rigidly mounted to the quick-connect assembly 101 and the other, free end flexibly engaging the wire 106 as it is inserted into the quick-connect assembly. The detector is a rotary potentiometer 104C in mechanical contact with the terminal spring element 102, configured to measure displacement of the terminal spring element 102 when the field wire 106 is inserted into the terminal spring element 102. The rotary potentiometer 104C measures the displacement or flexing of the terminal spring 102, which is approximately proportional to the displacement of the free end of the spring as the wire 106 is inserted beneath the end of the spring. The rotary potentiometer 104C is rotated when the terminal spring 102 is flexed in response to the insertion of the wire 106. The rotation of the rotary potentiometer 104C is converted into an electrical signal that varies with the tension or compression of the terminal spring 102 as the inserted wire 106 applies force on the free end of the spring. The rotary potentiometer 104C converts the tension or compression into a change in the electrical signal, which can then be measured as a sensor signal 107 by the sensor electronics 110. The tension or compression of the terminal spring 102 as the inserted wire 106 applies force on the free end of the spring, which is directly related to the diameter of the wire 106, as previously described. FIG. 2C" shows a graph of the sensor signal 107 in Volt units output from the rotary potentiometer 104C as a function of the size of the field wire 106. There are other example sensor technologies that can measure the displacement of the terminal spring 102, such as resolvers, encoders, Rotary Variable Differential Transformer (RVDT), Angular Variable Inductive Transducer (RVIT), Linear Variable Differential Transformers (LVDT) and Linear Variable Inductance Sensors (LVIT), which may be used as an alternative to the potentiometer 104C.

FIGS. 2D, 2D', and 2D" illustrate a detailed view of a photodiode gauge 104D detecting the size of wire 106 being connected to the breaker 100, according to an embodiment of the disclosure. The terminal spring 102 has one end rigidly mounted to the quick-connect assembly 101 and the other, free end flexibly engaging the wire 106 as it is inserted into the quick-connect assembly. The detector is a photodiode 104D positioned to receive light reflected from a surface of the terminal spring element 102, configured to measure displacement of the terminal spring element 102 when the field wire 106 is inserted into the terminal spring element 102. The light incident on the surface of the terminal spring element 102 is provided by the LED 109 mounted in the quick-connect assembly 101. The photodiode 104D measures the displacement or flexing of the terminal spring 102, which is approximately proportional to the displacement of the free end of the spring as the wire 106 is inserted beneath the end of the spring. The photodiode 104D is illuminated when the terminal spring 102 is flexed in response to the insertion of the wire 106. The illumination of the photodiode 104D is converted into an electrical signal that varies with the tension or compression of the terminal spring 102 as the inserted wire 106 applies force on the free end of the spring. The photodiode 104D converts the tension or compression into a change in the electrical signal, which can then be measured as a sensor signal 107 by the sensor electronics 110. The tension or compression of the terminal spring 102 as the inserted wire 106 applies force on the free end of the spring, which is directly related to the diameter of the wire 106, as previously described. FIG. 2D" shows a graph of the sensor signal 107 in Volt units output from the photodiode 104D as a function of the size of the field wire 106.

FIGS. 2E, 2E', and 2E" illustrate a detailed view of a photodiode gauge 104E detecting the size of wire 106 being connected to the breaker 100, based on a first example embodiment of a wire clamp in a terminal configured to receive a field wire 106 inserted into the wire clamp, according to an embodiment of the disclosure. The first example embodiment of the wire clamp in FIG. 2E comprises a release screw 120, spring 122, cage 123, and pressure plate 124, which apply a clamping force on the field wire 106 when the release screw 120 is adjusted by being released or backed out. A mask portion 126 of the cage 123 lies in the path of light between the LED 109 source of the light and the photodiode 104E that receives the light. As the cage 123 moves in response to the releasing or backing out of the release screw 120 on the wire 106, the light incident on the photodiode 104E changes due to movement of the mask 126. The illumination of the photodiode 104E is converted into an electrical signal that varies with the position of the cage 103 as the pressure plate 124 applies force on the wire 106. The photodiode 104E converts the position of the cage 123 into a change in the electrical signal, which can then be measured as a sensor signal 107 by the sensor electronics 110. The position of the cage 123 when contacting the inserted wire 106 is directly related to the diameter of the wire 106, as previously described.

FIG. 2E' shows the photodiode gauge of FIG. 2E, illustrating the progressive coverage by the mask 126 of the light transmitted from the LED 109 to the photodiode 104E as the release screw 120, cage 123, and spring 122 advance the pressure plate 124 down onto a larger diameter field wire 106, detecting the larger size of wire being connected to the breaker. FIG. 2E" shows the photodiode gauge of FIG. 2E, illustrating the more complete coverage by the mask 126 of the light transmitted from the LED 109 to the photodiode 104E as the release screw 120, cage 123, and spring 122 advance the pressure plate 124 further down onto a smaller diameter field wire 106, detecting the smaller size of wire being connected to the breaker.

Figure 2F:
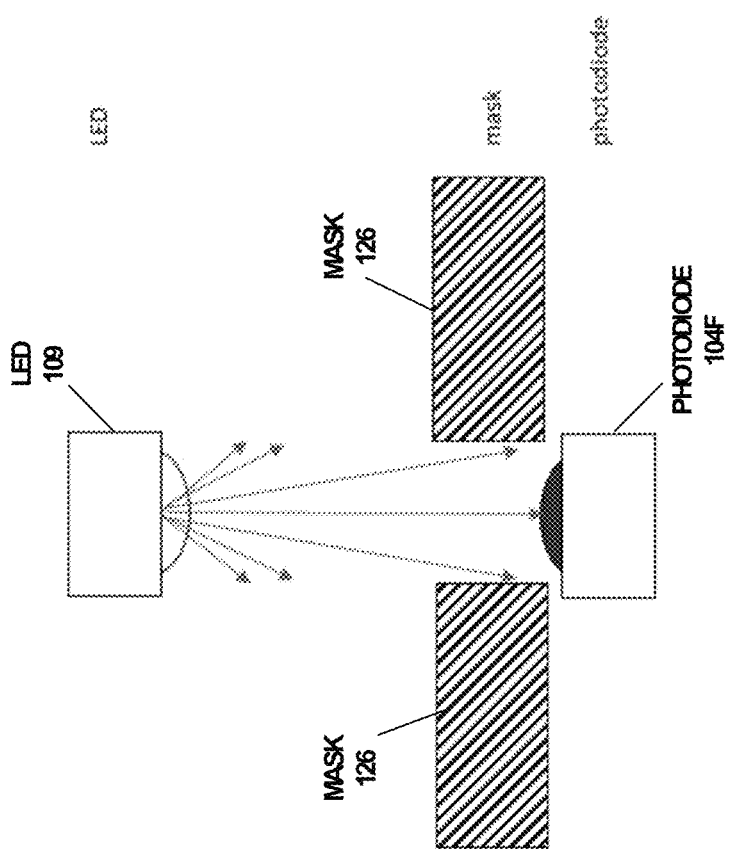
FIGS. 2F' 2F', and 2F'' illustrate a detailed view of a photodiode gauge detecting the size of wire being connected to the breaker, based on a second example embodiment of a wire clamp in a terminal configured to receive a field wire inserted into the wire clamp, according to an embodiment of the disclosure.
Figure 2F:
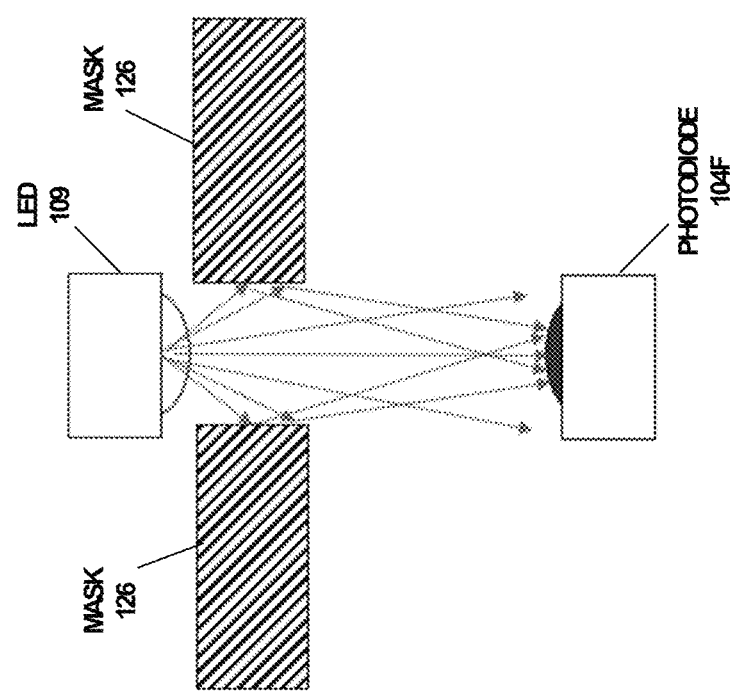

FIGS. 2F, 2F', and 2F" illustrate a detailed view of a photodiode gauge 104F detecting the size of wire 106 being connected to the breaker 100, based on a second example embodiment of a wire clamp in a terminal configured to receive a field wire 106 inserted into the wire clamp, according to an embodiment of the disclosure. The second example embodiment of the wire clamp in FIG. 2F comprises a release screw 120, spring 122, cage 123, and pressure plate 124, which apply a clamping force on the field wire 106 when the release screw 120 is adjusted by being released or backed out. FIGS. 2F' and 2F" illustrate the mask portion 126 of the cage 123, which lies in the path of light between the LED 109 source of the light and the photodiode 104F that receives the light. Light from the LED 109 passes through the aperture in the mask 126, with progressively less light passing through the aperture as the mask 126 and the pressure plate 124 press farther down onto smaller diameter wires. As the cage 123 moves in response to the releasing or backing out of the release screw 120 on the wire 106, the light incident on the photodiode 104F changes due to movement of the mask 126. The illumination of the photodiode 104F is converted into an electrical signal that varies with the position of the cage 103 as the pressure plate 124 applies force on the wire 106. The photodiode 104F converts the position of the cage 123 into a change in the electrical signal, which can then be measured as a sensor signal 107 by the sensor electronics 110. The position of the cage 123 when contacting the inserted wire 106 is directly related to the diameter of the wire 106, as previously described.

Figure 4:
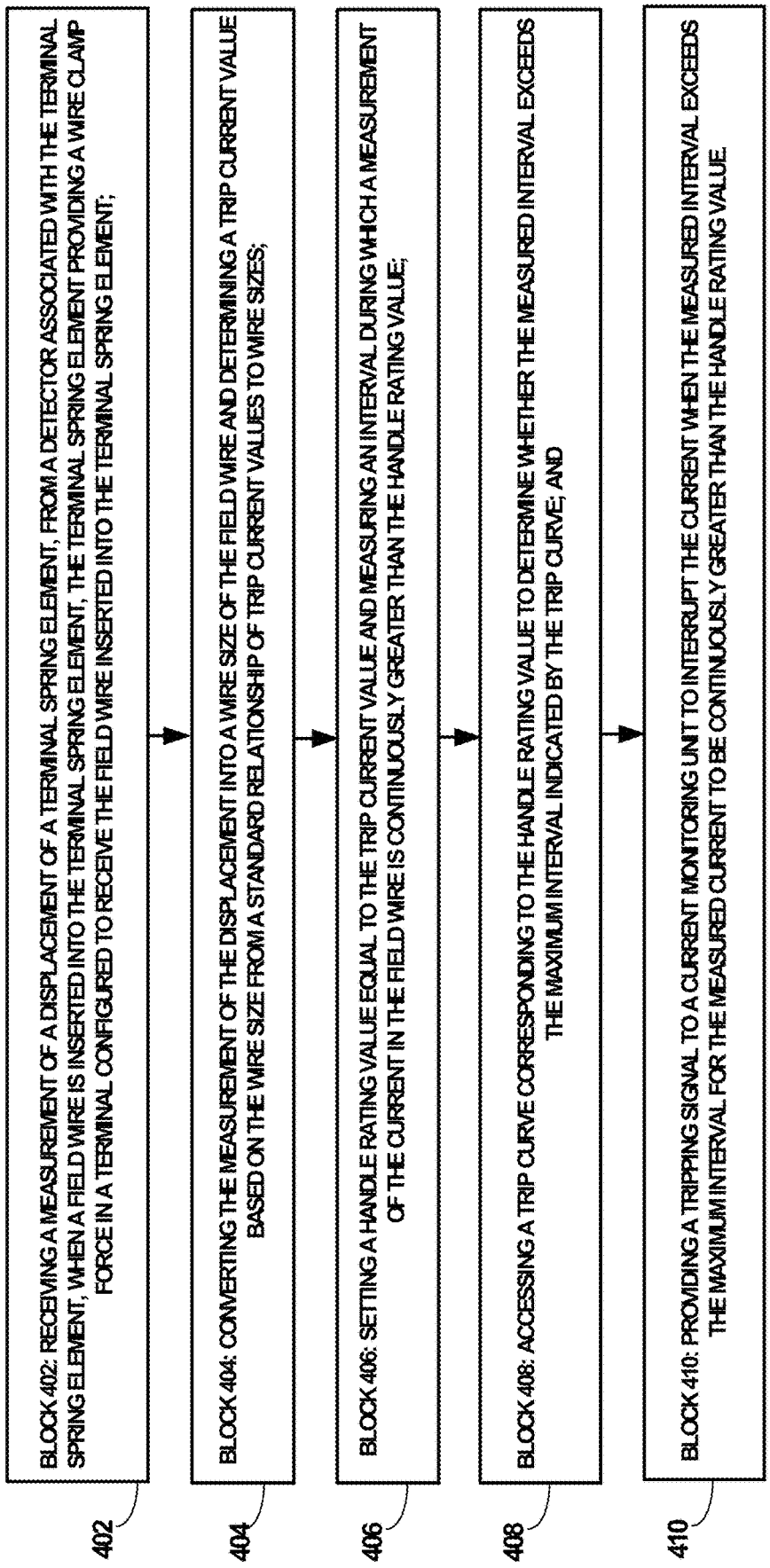
FIG. 4 is an example flow diagram of a method performed by the example component of the field programmable circuit breaker FIG. 1, according to an embodiment of the disclosure.

FIG. 4 is an example flow diagram 400 of a method performed by the example component 116 of the field programmable circuit breaker 100 of FIG. 1A and FIG. 3B, according to an embodiment of the disclosure. The logic blocks of the flow diagram 400 may be implemented by computer program instructions stored in the memory 114 and executed by the processor 112 in the micro-controller 105 of FIG. 1A and FIG. 3B. Alternately, the logic blocks of the flow diagram may also be implemented by computer hardware logic in the micro-controller 105 of FIG. 1A and FIG. 3B, which can carry out the functions specified by the logic blocks.

The method performed by the example component 116 comprises the following logic blocks:

Block 402: receiving a measurement of a displacement of a terminal spring element, from a detector associated with the terminal spring element, when a field wire is inserted into the terminal spring element, the terminal spring element providing a wire clamp force in a terminal configured to receive the field wire inserted into the terminal spring element;

Block 404: converting the measurement of the displacement into a wire size of the field wire and determining a trip current value based on the wire size from a standard relationship of trip current values to wire sizes;

Block 406: setting a handle rating value equal to the trip current value and measuring an interval during which a measurement of the current in the field wire is continuously greater than the handle rating value;

Block 408: accessing a trip curve corresponding to the handle rating value to determine whether the measured interval exceeds the maximum interval indicated by the trip curve; and Block 410: providing a tripping signal to a current monitoring unit to interrupt the current when the measured interval exceeds the maximum interval for the measured current to be continuously greater than the handle rating value.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus, comprising:
    a terminal spring element providing a wire clamp force in a terminal configured to receive a field wire inserted into the terminal spring element;
    a detector associated with the terminal spring element, configured to measure displacement of the terminal spring element when the field wire is inserted into the terminal spring element;
    a current monitoring unit configured to measure current in the field wire and interrupt the current when a magnitude of the current exceeds a trip current value for a maximum interval of time;
    at least one processor;
    at least one memory including computer program code, wherein the computer program code, when executed by operation of the at least one processor, performs an operation comprising:
        receiving a measurement of the displacement of the terminal spring element when the field wire is inserted into the terminal spring element;
        converting the measurement of the displacement into a wire size of the field wire and determine the trip current value based on the wire size from a standard relationship of trip current values to wire sizes;
        setting a handle rating value equal to the trip current value and measuring an interval during which a measurement of the current in the field wire is continuously greater than the handle rating value;
        accessing a trip curve corresponding to the handle rating value to determine whether the measured interval exceeds the maximum interval indicated by the trip curve; and
        providing a tripping signal to the current monitoring unit to interrupt the current when the measured interval exceeds the maximum interval for the measured current to be continuously greater than the handle rating value.

2. The apparatus of claim 1, wherein the detector comprises a strain gauge mounted on the terminal spring element, configured to measure displacement of the terminal spring element when the field wire is inserted into the terminal spring element.

3. The apparatus of claim 1, wherein the detector comprises a force gauge mounted on the terminal spring element, configured to measure displacement of the terminal spring element when the field wire is inserted into the terminal spring element.

4. The apparatus of claim 1, wherein the detector comprises a rotary potentiometer in mechanical contact with the terminal spring element, configured to measure displacement of the terminal spring element when the field wire is inserted into the terminal spring element.

5. The apparatus of claim 1, wherein the detector comprises a photodiode positioned to receive light reflected from a surface of the terminal spring element, configured to measure displacement of the terminal spring element when the field wire is inserted into the terminal spring element.

6. The apparatus of claim 1, wherein the operation further comprises:
    generating and outputting for display a user interface configured to provide a user control input to reduce the handle rating value to be less than the trip current value.

7. A method, comprising:
receiving a measurement of a displacement of a terminal spring element, from a detector associated with the terminal spring element, when a field wire is inserted into the terminal spring element, the terminal spring element providing a wire clamp force in a terminal configured to receive the field wire inserted into the terminal spring element;
converting the measurement of the displacement into a wire size of the field wire and determining a trip current value based on the wire size from a standard relationship of trip current values to wire sizes;
setting a handle rating value equal to the trip current value and measuring an interval during which a measurement of the current in the field wire is continuously greater than the handle rating value;
accessing a trip curve corresponding to the handle rating value to determine whether the measured interval exceeds the maximum interval indicated by the trip curve; and
providing a tripping signal to a current monitoring unit to interrupt the current when the measured interval exceeds the maximum interval for the measured current to be continuously greater than the handle rating value.

8. The method of claim 7, wherein the detector comprises a strain gauge mounted on the terminal spring element, configured to measure displacement of the terminal spring element when the field wire is inserted into the terminal spring element.

9. The method of claim 7, wherein the detector comprises a force gauge mounted on the terminal spring element, configured to measure displacement of the terminal spring element when the field wire is inserted into the terminal spring element.

10. The method of claim 7, wherein the detector comprises a rotary potentiometer in mechanical contact with the terminal spring element, configured to measure displacement of the terminal spring element when the field wire is inserted into the terminal spring element.

11. The method of claim 7, wherein the detector comprises a photodiode positioned to receive light reflected from a surface of the terminal spring element, configured to measure displacement of the terminal spring element when the field wire is inserted into the terminal spring element.

12. The method of claim 7, further comprising:
generating and outputting for display a user interface configured to provide a user control input to reduce the handle rating value to be less than the trip current.

13. A computer program product comprising computer executable program code recorded on a computer readable non-transitory storage medium, the computer executable program code comprising:
code for receiving a measurement of a displacement of a terminal spring element, from a detector associated with the terminal spring element, when a field wire is inserted into the terminal spring element, the terminal spring element providing a wire clamp force in a terminal configured to receive the field wire inserted into the terminal spring element;
code for converting the measurement of the displacement into a wire size of the field wire and determining a trip current value based on the wire size from a standard relationship of trip current values to wire sizes;
code for setting a handle rating value equal to the trip current value and measuring an interval during which a measurement of the current in the field wire is continuously greater than the handle rating value;
code for accessing a trip curve corresponding to the handle rating value to determine whether the measured interval exceeds the maximum interval indicated by the trip curve; and
code for providing a tripping signal to a current monitoring unit to interrupt the current when the measured interval exceeds the maximum interval for the measured current to be continuously greater than the handle rating value.

14. The computer program product of claim 13, wherein the detector comprises a strain gauge mounted on the terminal spring element, configured to measure displacement of the terminal spring element when the field wire is inserted into the terminal spring element.

15. The computer program product of claim 13, wherein the detector comprises a force gauge mounted on the terminal spring element, configured to measure displacement of the terminal spring element when the field wire is inserted into the terminal spring element.

16. The computer program product of claim 13, wherein the detector comprises a rotary potentiometer in mechanical contact with the terminal spring element, configured to measure displacement of the terminal spring element when the field wire is inserted into the terminal spring element.

17. The computer program product of claim 13, wherein the detector comprises a photodiode positioned to receive light reflected from a surface of the terminal spring element, configured to measure displacement of the terminal spring element when the field wire is inserted into the terminal spring element.

18. An apparatus, comprising:
a wire clamp in a terminal configured to receive a field wire inserted into the wire clamp;
a detector associated with the wire clamp, configured to measure displacement of the wire clamp when the field wire is inserted into the wire clamp;
a current monitoring unit configured to measure current in the field wire and interrupt the current when a magnitude of the current exceeds a trip current value for a maximum interval of time;
at least one processor;
at least one memory including computer program code, wherein the computer program code, when executed by operation of the at least one processor, performs an operation comprising:
receiving a measurement of the displacement of the wire clamp when the field wire is inserted into the wire clamp;
converting the measurement of the displacement into a wire size of the field wire and determine the trip current value based on the wire size from a standard relationship of trip current values to wire sizes;
setting a handle rating value equal to the trip current value and measuring an interval during which a measurement of the current in the field wire is continuously greater than the handle rating value;
accessing a trip curve corresponding to the handle rating value to determine whether the measured interval exceeds the maximum interval indicated by the trip curve; and
providing a tripping signal to the current monitoring unit to interrupt the current when the measured interval exceeds the maximum interval for the measured current to be continuously greater than the handle rating value.

19. The apparatus of claim 18, wherein the detector comprises a photodiode positioned to receive light from the wire clamp, configured to measure displacement of the wire clamp when the wire clamp is adjusted against the field wire.

20. The apparatus of claim 18, the operation further comprising:

generating and outputting for display a user interface configured to provide a user control input to reduce the handle rating value to be less than the trip current value.

\* \* \* \* \*